US011656863B2

(12) United States Patent
Minnis et al.

(10) Patent No.: US 11,656,863 B2
(45) Date of Patent: *May 23, 2023

(54) AUTOMATED BUCKET POLICY MANAGEMENT ARRANGEMENTS

(71) Applicant: Capital One Services, LLC, McLean, VA (US)

(72) Inventors: Rexwell Minnis, Tysons Corner, VA (US); Lane Martin, Richmond, VA (US); Warner Emdee, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/377,184

(22) Filed: Jul. 15, 2021

(65) Prior Publication Data

US 2021/0342140 A1 Nov. 4, 2021

Related U.S. Application Data

(63) Continuation of application No. 16/654,067, filed on Oct. 16, 2019, now Pat. No. 11,086,613, which is a continuation of application No. 16/518,424, filed on Jul. 22, 2019, now Pat. No. 10,489,144.

(51) Int. Cl.
*G06F 8/65* (2018.01)
*G06F 8/71* (2018.01)
*G06Q 10/0631* (2023.01)

(52) U.S. Cl.
CPC .............. *G06F 8/65* (2013.01); *G06F 8/71* (2013.01); *G06Q 10/063118* (2013.01)

(58) Field of Classification Search
None
See application file for complete search history.

(56) References Cited

U.S. PATENT DOCUMENTS

| | | | | |
|---|---|---|---|---|
| 7,120,916 | B1* | 10/2006 | Firth | H04L 67/02 717/116 |
| 8,650,250 | B2* | 2/2014 | Yamuna | H04L 63/102 709/201 |
| 10,489,144 | B1* | 11/2019 | Minnis | G06F 8/71 |
| 11,086,613 | B2* | 8/2021 | Minnis | G06Q 10/063118 |
| 2017/0244753 | A1* | 8/2017 | Hu | H04L 9/0891 |
| 2020/0252406 | A1* | 8/2020 | Padmanabhan | H04L 9/0891 |

* cited by examiner

*Primary Examiner* — Marina Lee
(74) *Attorney, Agent, or Firm* — KDW Firm PLLC

(57) ABSTRACT

Arrangements for automatically implementing bucket policy management making it automatic that all affected members are always completely and consistently informed of changes to a policy code as they occur, and making it automatic that a complete and accurate historical record is maintained regarding all policy code changes as they occur over time.

20 Claims, 7 Drawing Sheets

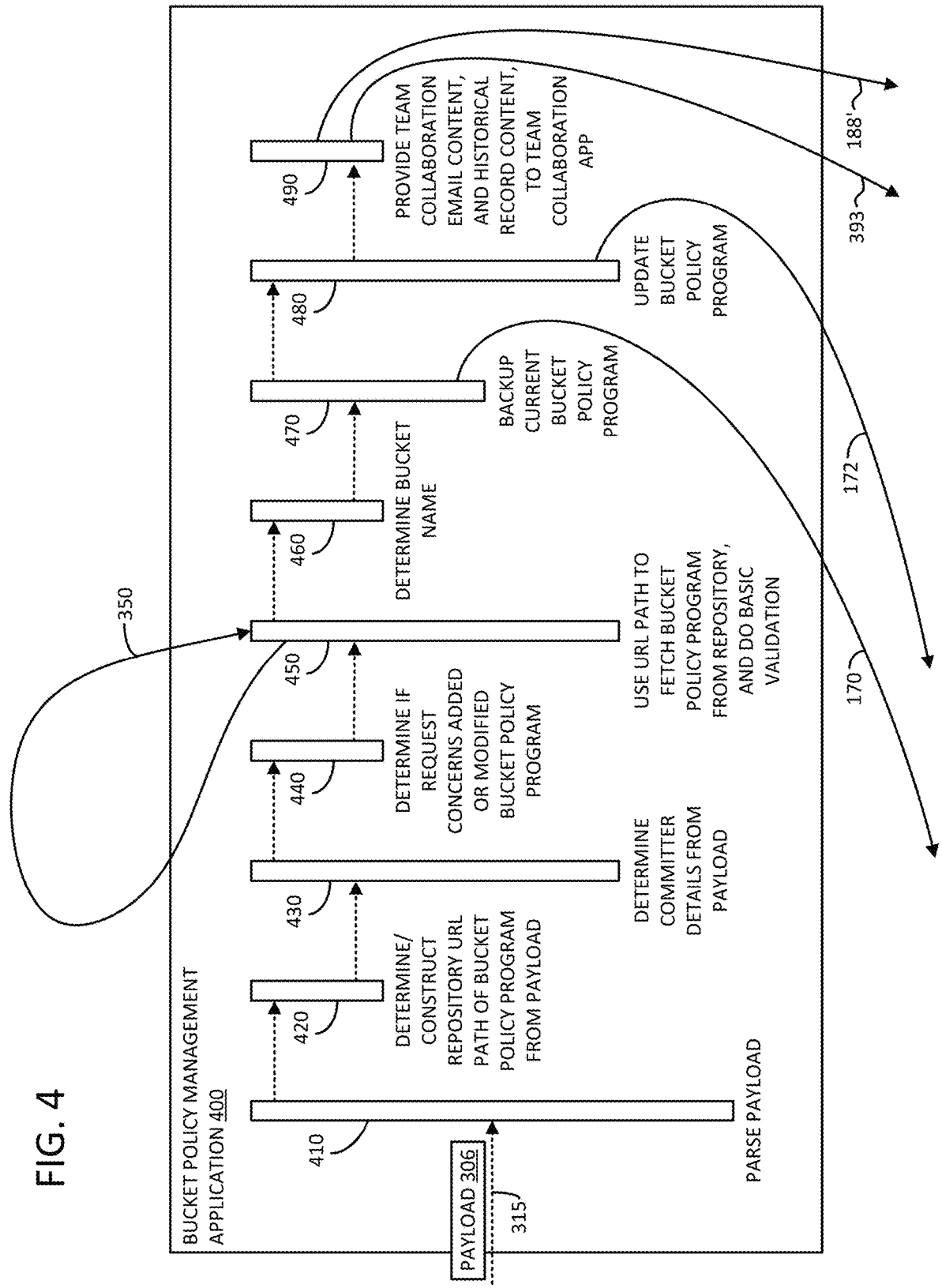

FIG. 5

```
┌─ Payload 306
{"ref":"refs/heads/master",
  "before":"77f14decdb4e4f15ed2b5e9421abc2dd19f47ab4",
  "after":"c3b19377b471e47c1bed70e9c57015034d219242",
  "created":false,"deleted":false,"forced":false,"base_ref":null,
  "compare":"https://github.kdc.VendorX.com/Crd-Rewards/rewards-aws-bucket-
policies/compare/77f14decdb4e...c3b19377b471", "commits":[{"id":"c3b19377b471e47c1bed70e9c57015034d219242","tree_id":"e1c44b4ebbae
340f3709d0f54ca204d7429d2254",
    "distinct":true,"message":"Update cof-card-dev-rewardscrd-dev-awsresources-
west.json\n\nAdditional updates.",
    "timestamp":"2014-02-22T14:47:47-05:00",
    "url":"https://github.kdc.VendorX.com/Crd-Rewards/rewards-aws-bucket-          ── 510
     policies/commit/c3b19377b471e47c1bed70e9c57015034d219242",
    "author":{"name":"Doe, John","email":"John.Doe@VendorX.com","username":"gsl475"},  ── 520
    "committer":{"name":"GitHub Enterprise","email":"noreply@github.kdc.VendorX.com"},
    "added":[],
    "removed":[],                                                                    ── 530
    "modified":["dev/cof-card-dev-rewardscrd-dev-awsresources-west.json"]}],

...

"bucket":{"id":305304,"name":"rewards-aws-bucket-policies","full_name":"Crd-      ── 540
   Rewards/rewards-aws-bucket-policies",
   "owner":{"name":"Crd-Rewards",
   "email":"Mary.Smith@VendorX.com",
   "login":"Crd-Rewards",
   "id":2051,
   "avatar_url":"https://github.kdc.VendorX.com/avatars/u/2051?",

Non-Transitory Storage Medium 600

Computer Executable Instructions for 300

Computer Executable Instructions for ...

Computer Executable Instructions for ...

Computer Executable Instructions for ...

Computer Executable Instructions for ...

Computer Executable Instructions for ...

Data

AUTOMATED BUCKET POLICY MANAGEMENT ARRANGEMENTS

RELATED APPLICATIONS

This application is a continuation of U.S. patent application Ser. No. 16/654,067 (now U.S. Pat. No. 11,086,613), filed Oct. 16, 2019, which is a continuation of U.S. patent application Ser. No. 16/518,424 (now U.S. Pat. No. 10,489, 144), filed Jul. 22, 2019. The contents of the aforementioned applications are incorporated herein by reference in their entirety.

TECHNICAL FIELD

Embodiments described herein are generally related to automated bucket policy management arrangements.

BACKGROUND

An organization (e.g., company; educational institution; governmental entity; association; etc.) may divide functions or services that it provides into differing tasks (e.g., projects), and may have differing teams (i.e., groups of personnel) assigned with the responsibility of the differing tasks, respectively. One example organization might be a financial institution, and one example task might be the overseeing of a "cash-back" program associated with usage of the financial institution's credit (and/or debit) cards. The team members may be tasked with establishing and updating policy code (e.g., programming) which when executed (e.g., in real-time), implements a policy or policies (hereinafter, "policy") of the task. The personnel members of a team assigned to a given task may be dynamic and vary greatly over time (e.g., some personnel members may be unassigned or newly-assigned to the team over time).

As policy code is established or updated, it is very important that all current team members having responsibility for the task be completely and consistently informed of changes to the policy code as the changes occur (i.e., in real-time or near-real-time). Further, it may be important to maintain a historical record of various information of code changes which have been requested over time, for example, a copy of each policy code implemented, as well as collaboration comments of the various team members, and to provide access to that historical record to the current team members.

In addition to a code change affecting the subject task, some tasks may have an interrelationship with, and affect, other tasks as well. For example, a change in policy code to Task A might affect a policy code of Task B, Task C, etc. Accordingly, Task B, Task C, etc., members might have a strong interest in being provided information in real-time or near real-time regarding Task A policy code changes. Thus, there may be Task B, Task C, etc., personnel beyond the subject task's team members who also should be completely and consistently informed of changes to the subject policy code and/or have access to the historical record of subject policy code changes One problem which may result in relation to all the above is that there may be a failure in management in keeping all affected members completely and consistently informed of changes as they occur. Another problem is that there may be a failure in management in keeping a complete and accurate historical record over time.

What is needed are arrangements for automatically implementing bucket policy management wherein it is automatic that all affected members are always completely and consistently informed of changes to a policy code as they occur, and it is automatic that a complete and accurate historical record is maintained regarding all policy code changes as they occur over time.

SUMMARY

Provided are arrangements for automatically implementing bucket policy management making it automatic that all affected members are always completely and consistently informed of changes to a policy code as they occur, and making it automatic that a complete and accurate historical record is maintained regarding all policy code changes as they occur over time.

That is, example first embodiments are directed to a non-transitory, computer-readable storage medium embodying a bucket policy management program which, when executed, causes computer to implement bucket policy management operations for bucket policy code changes, the bucket policy management operations comprising:
monitoring for receipt into a topic, of a payload indicative of a bucket policy code change submitted per request of a committer; and
triggering an automatic bucket policy management handling designated for the topic, the bucket policy management handling including automatically:
  determining, from the payload, a Uniform Resource Locator (URL) path to a repository location where the bucket policy code is stored;
  determining, from the payload, details of the committer who requested the bucket policy code change;
  determining, from the payload, whether a type of the bucket policy code change is a new bucket policy code or an updated bucket policy code;
  utilizing the URL path to fetch the bucket policy code from the repository location, and if checking a predetermined validation of the bucket policy code is successful:
  determining a bucket name of a bucket for holding the bucket policy code;
  storing a backup copy of any existing bucket policy code in the bucket having the bucket name; and
  updating the existing bucket policy code in the bucket with the bucket policy code of the bucket policy code change; and
  notifying a team collaboration hub service of predetermined information selected from a list including: the bucket policy code change; the details of the committer who requested the bucket policy code change; the type of the bucket policy code change; whether validation of the bucket policy code was successful; and the bucket name of the bucket holding the bucket policy code.

In example second embodiments based on the first embodiments, the payload is configured to comprise payload content detailing at least: the URL path to the repository location where the bucket policy code is stored; details of the committer who requested the bucket policy code change; and whether a type of the bucket policy code change is a new bucket policy code or an updated bucket policy code.

In example third embodiments based on the second embodiments, the determining of the URL path, the details of the committer and the type of the bucket policy code change is determined by parsing, from the payload content: the URL path to the repository location where the bucket policy code is stored; details of the committer who requested the bucket policy code change; and whether the type of the bucket policy code change is a new bucket policy code or an updated bucket policy code.

In example fourth embodiments based on the first embodiments, the payload is configured to comprise content detailing at least: the URL path to the repository location where the bucket policy code is stored; details of the committer who requested the bucket policy code change; whether a type of the bucket policy code change is a new bucket policy code or an updated bucket policy code; and, a bucket name of a bucket for holding the bucket policy code.

In example fifth embodiments based on the fourth embodiments, the determining of the URL path, the details of the committer, the type of the bucket policy code change and the bucket name, is determined by parsing, from the payload content: the URL path to the repository location where the bucket policy code is stored; details of the committer who requested the bucket policy code change; whether the type of the bucket policy code change is a new bucket policy code or an updated bucket policy code; and, the bucket name of the bucket for holding the bucket policy code.

In example sixth embodiments based on the first embodiments, the bucket policy management program is implemented as an Amazon Web Services (AWS) Lambda function which is triggered to execute responsive to the receipt into the topic, of the payload indicative of the bucket policy code change submitted per request of the committer.

In example seventh embodiments based on the first embodiments, the bucket policy management operations further comprising:
if the checking of the predetermined validation of the bucket policy code is unsuccessful, providing a communication to the committer informing of an unsuccessful validation.

Next, example eighth embodiments are directed to a bucket policy management method to implement bucket policy management operations for bucket policy code changes, the bucket policy management method comprising:
monitoring for receipt into a topic, of a payload indicative of a bucket policy code change submitted per request of a committer; and
triggering an automatic bucket policy management handling designated for the topic, the bucket policy management handling including automatically:
 determining, from the payload, a Uniform Resource Locator (URL) path to a repository location where the bucket policy code is stored;
 determining, from the payload, details of the committer who requested the bucket policy code change;
 determining, from the payload, whether a type of the bucket policy code change is a new bucket policy code or an updated bucket policy code;
 utilizing the URL path to fetch the bucket policy code from the repository location, and if checking a predetermined validation of the bucket policy code is successful:
 determining a bucket name of a bucket for holding the bucket policy code;
 storing a backup copy of any existing bucket policy code in the bucket having the bucket name; and
 updating the existing bucket policy code in the bucket with the bucket policy code of the bucket policy code change; and
notifying a team collaboration hub service of predetermined information selected from a list including: the bucket policy code change; the details of the committer who requested the bucket policy code change; the type of the bucket policy code change; whether validation of the bucket policy code was successful; and the bucket name of the bucket holding the bucket policy code.

In example ninth embodiments based on the eighth embodiments, the payload is configured to comprise payload content detailing at least: the URL path to the repository location where the bucket policy code is stored; details of the committer who requested the bucket policy code change; and whether a type of the bucket policy code change is a new bucket policy code or an updated bucket policy code.

In example tenth embodiments based on the ninth embodiments, the determining of the URL path, the details of the committer and the type of the bucket policy code change is determined by parsing, from the payload content: the URL path to the repository location where the bucket policy code is stored; details of the committer who requested the bucket policy code change; and whether the type of the bucket policy code change is a new bucket policy code or an updated bucket policy code.

In example eleventh embodiments based on the eighth embodiments, the payload is configured to comprise content detailing at least: the URL path to the repository location where the bucket policy code is stored; details of the committer who requested the bucket policy code change; whether a type of the bucket policy code change is a new bucket policy code or an updated bucket policy code; and, a bucket name of a bucket for holding the bucket policy code.

In example twelfth embodiments based on the eleventh embodiments, the determining of the URL path, the details of the committer, the type of the bucket policy code change and the bucket name, is determined by parsing, from the payload content: the URL path to the repository location where the bucket policy code is stored; details of the committer who requested the bucket policy code change; whether the type of the bucket policy code change is a new bucket policy code or an updated bucket policy code; and, the bucket name of the bucket for holding the bucket policy code.

In example thirteenth embodiments based on the eighth embodiments, at least a portion of the bucket policy management method is implemented via an Amazon Web Services (AWS) Lambda function which is triggered to execute responsive to the receipt into the topic, of the payload indicative of the bucket policy code change submitted per request of the committer.

In example fourteenth embodiments based on the eighth embodiments, if the checking of the predetermined validation of the bucket policy code is unsuccessful, providing a communication to the committer informing of an unsuccessful validation.

Still further, example eighth embodiments are directed to a system configured to automatically implement bucket policy management operations for bucket policy code changes, the system comprising:
at least one hardware processor and memory arrangement configured to:
 monitor for receipt into a topic, of a payload indicative of a bucket policy code change submitted per request of a committer; and trigger an automatic bucket policy management handling designated for the topic, the bucket policy management handling including automatically:
 determining, from the payload, a Uniform Resource Locator (URL) path to a repository location where the bucket policy code is stored;

determining, from the payload, details of the committer who requested the bucket policy code change;
determining, from the payload, whether a type of the bucket policy code change is a new bucket policy code or an updated bucket policy code;
utilizing the URL path to fetch the bucket policy code from the repository location, and if checking a predetermined validation of the bucket policy code is successful:
determining a bucket name of a bucket for holding the bucket policy code;
storing a backup copy of any existing bucket policy code in the bucket having the bucket name; and
updating the existing bucket policy code in the bucket with the bucket policy code of the bucket policy code change; and
notifying a team collaboration hub service of predetermined information selected from a list including: the bucket policy code change; the details of the committer who requested the bucket policy code change; the type of the bucket policy code change; whether validation of the bucket policy code was successful; and the bucket name of the bucket holding the bucket policy code.

In example sixteenth embodiments based on the fifteenth embodiments, the payload is configured to comprise payload content detailing at least: the URL path to the repository location where the bucket policy code is stored; details of the committer who requested the bucket policy code change; and whether a type of the bucket policy code change is a new bucket policy code or an updated bucket policy code.

In example seventeenth embodiments based on the sixteenth embodiments, the determining of the URL path, the details of the committer and the type of the bucket policy code change is determined by parsing, from the payload content: the URL path to the repository location where the bucket policy code is stored; details of the committer who requested the bucket policy code change; and whether the type of the bucket policy code change is a new bucket policy code or an updated bucket policy code.

In example eighteenth embodiments based on the fifteenth embodiments, the payload is configured to comprise content detailing at least: the URL path to the repository location where the bucket policy code is stored; details of the committer who requested the bucket policy code change; whether a type of the bucket policy code change is a new bucket policy code or an updated bucket policy code; and, a bucket name of a bucket for holding the bucket policy code.

In example nineteenth embodiments based on the eighteenth embodiments, the determining of the URL path, the details of the committer, the type of the bucket policy code change and the bucket name, is determined by parsing, from the payload content: the URL path to the repository location where the bucket policy code is stored; details of the committer who requested the bucket policy code change; whether the type of the bucket policy code change is a new bucket policy code or an updated bucket policy code; and, the bucket name of the bucket for holding the bucket policy code.

In example twentieth embodiments based on the fifteenth embodiments, the at least one hardware processor and memory arrangement further configured to:
if the checking of the predetermined validation of the bucket policy code is unsuccessful, providing a communication to the committer informing of an unsuccessful validation.

It is to be understood that both the foregoing general description and the following detailed description are example embodiments and explanatory only and are not restrictive of the disclosed embodiments, as claimed.

BRIEF DESCRIPTION OF THE DRAWINGS

FIG. 4 illustrates a flow diagram example showing greater details of a BUCKET POLICY MANAGEMENT APPLICATION 400 included within the FIG. 3 time plot example.

FIG. 5 illustrates a payload example showing greater details of a PAYLOAD 306 included within the FIG. 3 time plot example and used in the FIG. 4 flow diagram example.

FIG. 6 illustrates an example embodiment of a storage medium.

DETAILED DESCRIPTION

Reference will now be made in detail to the disclosed embodiments, examples of which are illustrated in the accompanying drawings.

Figure 1:
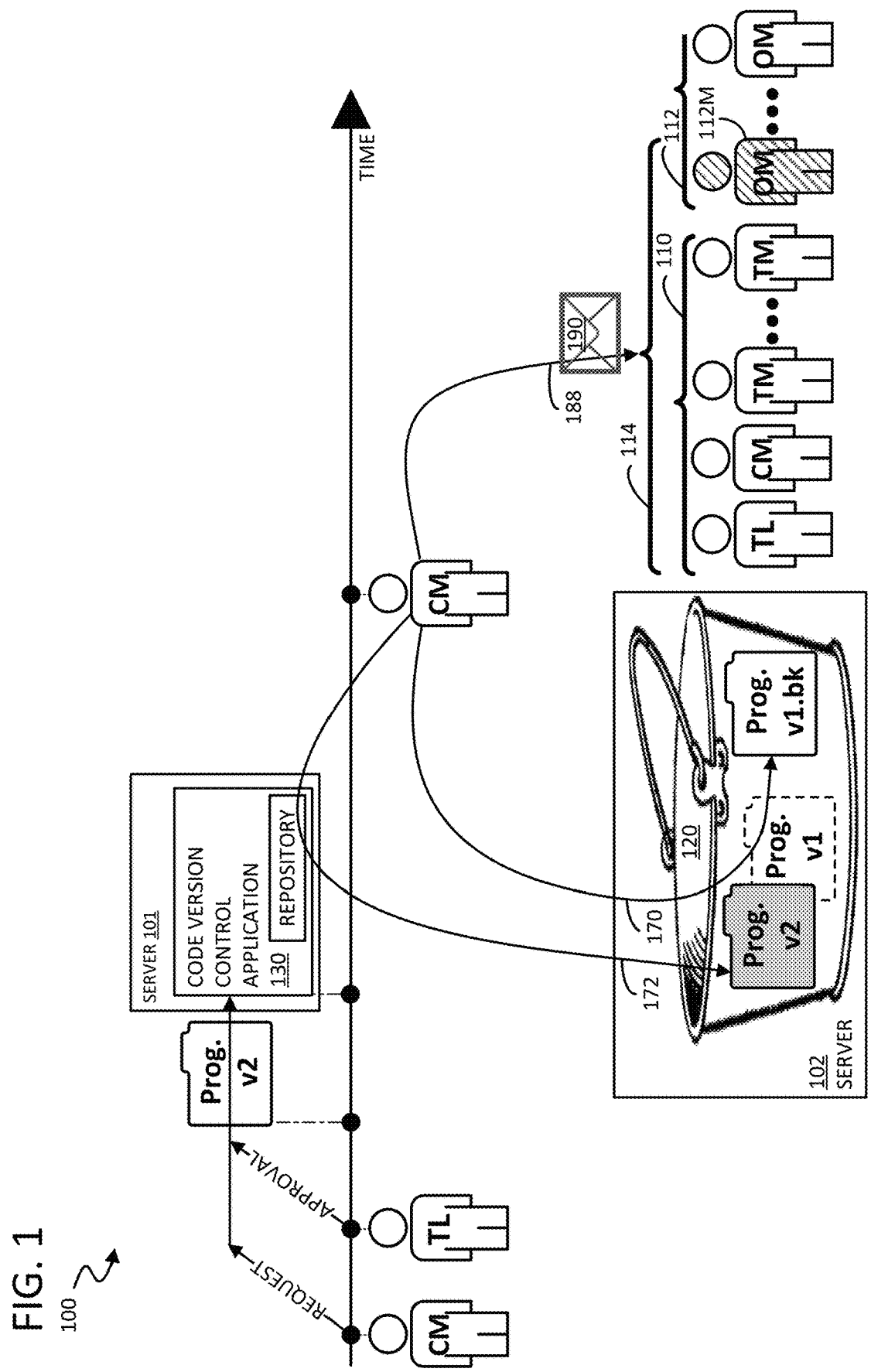
FIG. 1 illustrates a time plot example using block diagrams to illustrate a manual (non-automatic) bucket policy management arrangement where (in an ideal implementation) all affected members are completely and consistently informed of changes to a policy code as they occur, and where some aspects of a historical record are maintained regarding all policy code changes as they occur over time.

More particularly, FIG. 1 illustrates a time plot example 100 using block diagrams to illustrate a manual (non-automatic) bucket policy management arrangement where (in an ideal implementation) all affected members are completely and consistently informed of changes to a policy code as they occur, and where at least certain aspects of a historical record are maintained regarding all policy code changes as they occur over time.

Within FIG. 1, the longest horizontal line represents a time axis TIME. Further shown are two servers 101 and 102, wherein server 101 provides code version control services and server 102 provides bucket policy storage services. While servers 101 and 102 are illustrated as being separate servers, practice of the present embodiments is not limited to having separate servers, or to having only two servers. More particularly, as one example, code version control services and bucket policy storage services might be provided by a single (common) server. As another example, the code version control services might be provided by plural servers rather than a single (sole) server 101. Similarly, the bucket policy storage services might be provided by plural servers rather than a single (sole) server 102.

In a lower right portion of FIG. 1, shown is a team 110 of a group of personnel tasked with (i.e., assigned) the responsibility of developing, updating, etc., a subject policy code. One example subject policy code might be the code which implements one portion of a financial institution's "cash-back" rewards program. For example, the subject policy code might set (i.e., define) differing classes of bank customers as getting differing levels of rewards, respectively. As one example, a currently-implemented subject policy code might be configured to reward differing classes as follows: 1% cash back for all bank-brand credit card purchases for any customer maintaining a minimum $500.00 daily average balance in his/her bank account; 2% cash back for all bank-brand credit card purchases for any customer maintaining a minimum $2000.00 daily average balance in his/her bank account; and 2% cash back for all bank-brand credit card purchases for any senior-citizen qualified (e.g., 55 years old+) customer irrespective of the daily average balance in his/her bank account.

Continuing, team 110 may include a team leader TL, a committer member CM (i.e., member who requests or commits to a current policy code change) and other team members TM. In order to remain well-informed so that all team members are always operating from a same understanding regarding all subject policy code items, all members TL, CM and TM should each be completely and consistently informed of all changes to a policy code over time as such changes occur. Further, all members TL, CM and TM should each have access to a historical record maintained regarding all policy code changes which have been implemented over time for the subject policy code.

Also shown is a Team 112 of differing group of personnel who are not tasked with the responsibility of developing, updating, etc., of the subject policy code, but may be tasked with the responsibility of developing, updating, etc., a differing policy code (not shown). Such team 112 may include plural other members OM.

In some embodiments, the implementation of the differing policy code may be dependent in some way upon the implementation of the subject policy code, i.e., the differing policy code might be dependent policy code. For example, the subject policy code might (upon implementation) supply data items as inputs needed in implementation of the differing policy code. As a non-limiting example, if a changed subject policy code suddenly eliminates one or more data item which was previously supplied onward to the differing policy code, such data item elimination might cause the differing policy code to subsequently fail in implementation as it did not receive an expected input data.

As one example, in the previously discussed data items concerning the subject policy code which set (i.e., defined) differing classes of bank customers as getting differing levels of "cash-back" rewards, if the "2% cash back for all bank-brand credit card purchases for any senior-citizen qualified customer irrespective of the daily average balance in his/her bank account" was eliminated, then the differing policy code which is configured to depend on receiving information on defined differing classes including a senior-citizen class, might fail when it no longer receives updated senior-citizen class definition data.

In view of recognition of the dependence of the code, one or more team 112 member may be designated as a related-policy-monitoring (RPM) member 112M (distinguished via cross-hatching in FIG. 1) who is assigned the responsibility of: remaining knowledgeable regarding any interfacing between the subject policy code and the differing policy code. Such RPM member 112M might also be assigned the responsibility of effecting an appropriate action whenever a change to the subject policy code affects implementation (e.g., interfacing) of the differing policy code.

As one example, when there is a change to the subject policy code, the RPM member 112M might provide feedback comments back to the other team 110. As another example, the RPM member 112M might inform his own team 112 members of a need to adjust the differing policy code in view of the change to the subject policy code. In any event, in a code-dependence situation, it is important that the RPM member 112M also (in addition to the team 110 members) be completely and consistently informed of all changes to a subject policy code as such changes occur over time. Further, it might also be important for the RPM member 112M to have access to the historical record maintained regarding all historical policy code changes which have been implemented to the subject policy code over time.

With the above in mind, all personnel members who must be informed of changes to a policy code and must have access to the historical record are herein known as notification members. Notification members are show representatively within FIG. 1 by being included within a range of a notification member bracket 114. The fact that team 112 also has members who are not bracketed within bracket 114 is illustrative of the fact that such members are not included as notification members. In some embodiments, the team 112 members not included as notification members would not receive any notifications originating from a team 110 side regarding changes made to the subject policy code, i.e., to minimize a notification burden that these non-notification members receive. These non-notification members would however, in some embodiments, receive any notifications which are originated by their own RPM team member 112M regarding changes made to the related subject policy code.

In continuing the description, FIG. 1's server 101 is illustrated as including a CODE VERSION CONTROL APPLICATION 130 which, in turn, may include or be associated with a REPOSITORY (e.g., for storing various code versions). The server 101 and/or the application 130 may, in some embodiments, offer distributed version control and source code management (SCM) functionality. Further, in some embodiments, it may further provide access control as well as collaboration features such as bug tracking, feature requests, task management, and wikis for every project.

The server 101 and the CODE VERSION CONTROL APPLICATION 130 may be proprietary and owned/maintained by the organization (e.g., company; educational institution; governmental entity; association; etc.) which is implementing the subject policy code. Alternatively, the server 101 and the CODE VERSION CONTROL APPLICATION 130 may be owned/maintained by a third-party entity and be web-based so as to be publicly- or commercially-available for free use or via some type of payment (e.g., per-use fee; tiered-usage fee; time-based subscription fee; etc.). One example commercially-available server and/or code version control application service might be Git and/or GitHub available via the Internet.

Continuing, FIG. 1's server 102 providing bucket policy storage services, is shown including one or more bucket (e.g., folder) 120. Although FIG. 1 illustrates only a single bucket for sake of simplicity and brevity, in a practical implementation the server 102 would include plural (e.g., many hundreds or thousands of) buckets. Bucket 120 may, in some embodiments, be dedicated to storing computer files (shown representatively in FIG. 1 by file icons) or other information related to multiple versions (e.g., generations) of a single policy code. In the present description, bucket 120 will be assumed to be dedicated to storing computer files related to a subject policy code which is to be changed (e.g., updated).

The server 102 and any storage application (not shown) running thereon may be proprietary and owned/maintained by the organization (e.g., company; educational institution; governmental entity; association; etc.) which is implementing the subject policy code. Alternatively, the server 102 and storage application may be owned/maintained by a third-party entity and be web-based so as to be publicly- or commercially-available for free use or via some type of payment (e.g., per-use fee; tiered-usage fee; time-based subscription fee; etc.). One example commercially-available server and/or storage application service might be Amazon's Simple Storage Service (S3) operating as a public cloud storage resource available via Amazon Web Services' (AWS). Amazon S3's buckets, which are similar to file folders, store objects (e.g., files), which consist of data and its descriptive metadata.

Description turns now to a time-based description of FIG. 1's time plot example to describe a manual (non-automatic) bucket policy management arrangement. More particularly, assume that over time, one or more of the team 110 members works up a revised version of the subject policy code which he/she feels should be implemented. For sake of simplicity and brevity in the descriptions to follow, it will be assumed that a single team member authors the change to be implemented, although practice of embodiments is not limited to a single team member authoring changes.

As one example change, in the previously discussed data items concerning the subject policy code which set (i.e., defined) differing classes of bank customers as getting differing levels of "cash-back" rewards, assume that the revised subject policy code is to eliminate the "2% cash back for all bank-brand credit card purchases for any senior-citizen qualified customer irrespective of the daily average balance in his/her bank account". At the point where the team member TM is satisfied with his/her changes and requests (see FIG. 1's "REQUEST" arrow) that his/her updated policy code be implemented (see "Prog.v2" file illustrated after the "REQUEST" arrow), such team member(s) becomes a committer member CM (i.e., member who requests or commits to a current policy code change).

Responsive to the REQUEST, the team 110's team leader TL (having a high level of experience and knowledge regarding many differing policy codes across the organization) may review and submit APPROVAL for the subject policy code change REQUEST. Responsive to the REQUEST and/or APPROVAL, the updated subject policy code Prog.v2 is inputted and processed through the CODE VERSION CONTROL APPLICATION 130 of the server 101. The processed Prog.v2 is stored within the REPOSITORY of the server 101, and is accessible via knowledge of a Uniform Resource Locator (URL) address pointing to the stored version of the Prog.v2 code. Thereafter, the committer member CM is tasked with manually performing the following management operations.

More particularly, as shown representatively by solid arrow 170, the committer member CM accesses the bucket 120 to save a back-up copy (shown by FIG. 1's solid-line "Prog.v1.bk" file) of a currently-implemented subject policy code (shown by dashed-line "Prog.v1" file). Saving a back-up copy Prog.v1.bk provides the ability to easily reimplement (i.e., re-deploy) the currently-implemented subject policy code in the event that the updated subject policy code needs to be retracted for any reason (e.g., bugs; unpopular change; etc.).

Next, as show representatively by the solid arrow 172, the committer member CM accesses a copy of the processed Prog.v2 computer file for the updated subject policy code as previously stored within the REPOSITORY by the CODE VERSION CONTROL APPLICATION 130, and uses it to overwrite the currently-implemented subject policy code (overwriting shown representatively by FIG. 1's dashed-line "Prog.v1" file being partially overlapped by solid-line Prog.v2 file). After writing the Prog.v2 computer file into the bucket 120, the Prog.v2 becomes deployed and is running live, whereupon the updated subject policy code has been implemented (shown representatively by the FIG. 1 Prog.v2 file being darkened or shaded).

As a further manual operation, the committer member CM also sends (see FIG. 1's representative arrow 188) a communication 190 to all notification members included within the scope of the FIG. 1 notification member bracket 114.

While FIG. 1 illustrates an ideal implementation where all bucket policy management operations are conducted so that all notification members are completely and consistently informed of changes to a policy code as they occur, and where aspects of the historical record (e.g., policy program backup) are maintained regarding all policy code changes as they occur over time, a real-world implementation may be less than ideal. More particularly, a multitude of failures can occur with respect to the FIG. 1 manual (non-automatic) bucket policy management operations, as can be shown by FIG. 2's flow 200.

Figure 2:
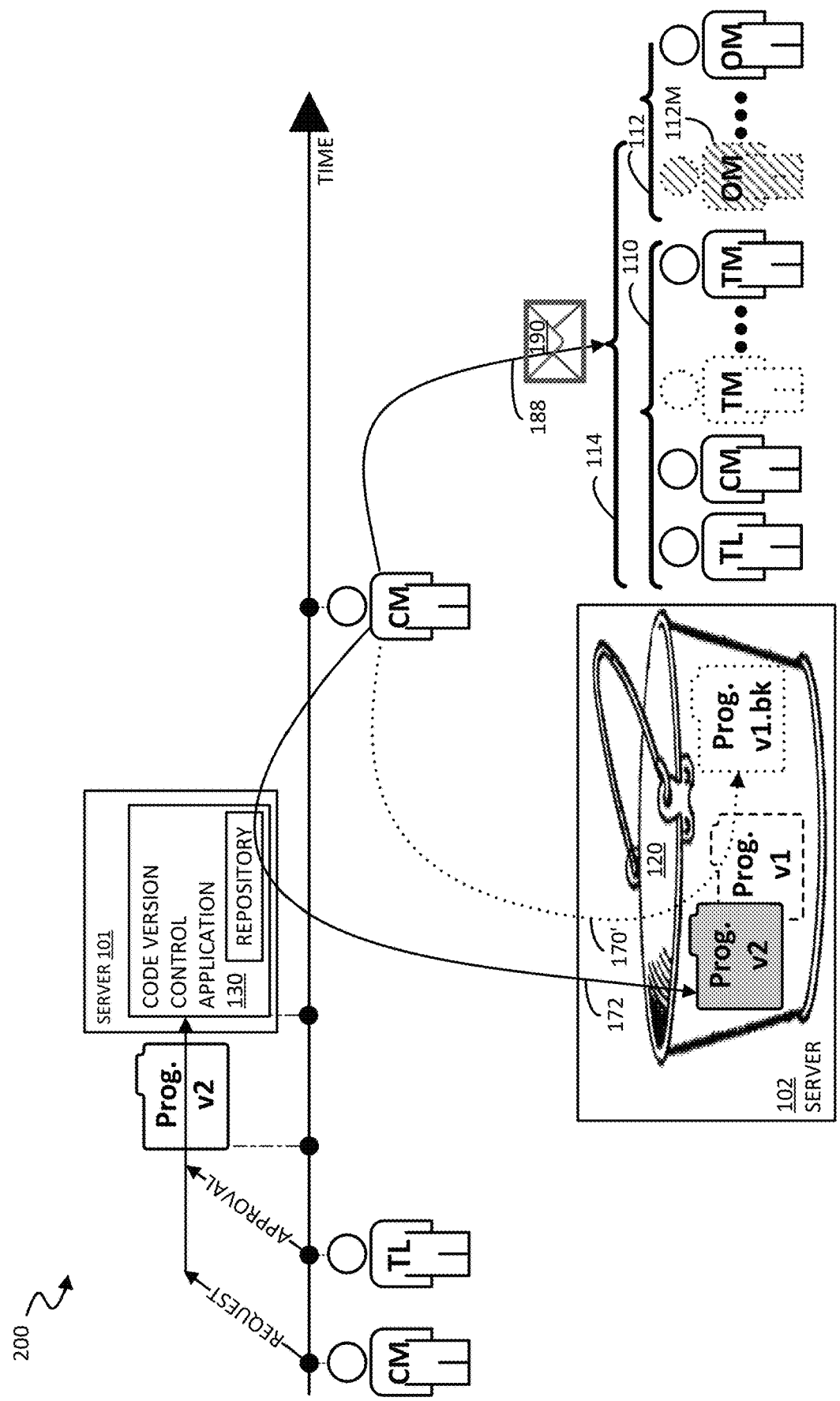
FIG. 2 illustrates FIG. 1's manual time plot example where (in a less-than-ideal implementation) not all affected members are completely and consistently informed of changes to a policy code as they occur, and where an expected historical record is not maintained regarding all policy code changes as they occur over time.

As one example failure, the committer member CM might fail (e.g., forget) to first access the bucket 120 to save a back-up copy of a currently-implemented subject policy code (failure is shown representatively by the FIG. 2 dotted arrow 170' and dotted Prog.v1.bk file). Not saving a back-up copy Prog.v1.bk is disadvantageous in that non-saving thwarts the ability to easily reimplement (i.e., re-deploy) the currently-implemented subject policy code in the event that the updated subject policy code needs to be retracted for any reason (e.g., bugs; unpopular change; etc.). Not saving is also disadvantageous in that a part or link of the deployment history (i.e., Prog.v1) of the subject policy code is not memorialized within the history.

As another example failure, the committer member CM might fail to copy all notification members within the notification member bracket 114. That is, the member CM might simply forget, might simply not have a complete list of notification members, etc. FIG. 2 selectively substitutes a dotted line (instead of a solid line) for outlines of several notification members, to representatively illustrate an example of two notification members (TM and OM 112M) having not been sent any communication 190 from the committer member CM to inform of the subject policy code update. A team member TM of team 110 not having received the communication is disadvantageous in that the missed team member TM: would not be able to perform any review of the updated subject policy code and provide collaborative feedback comments to the team 110; and, any subsequent work performed on the subject policy code by him/her would be based upon an erroneous misunderstanding that the prior subject policy code was still in deployment.

Next, the other team member OM of team 112 not having received the communication is disadvantageous in that the missed team member TM: would not be able to perform any review of the updated subject policy code and provide collaborative feedback comments to the team 110; would not be able to recognize a need to adjust the differing policy code in view of the change to the subject policy code; and thus would not be able to inform his own team 112 members of the changed subject policy code or the need to adjust their differing (but dependent) policy code.

Figure 3:
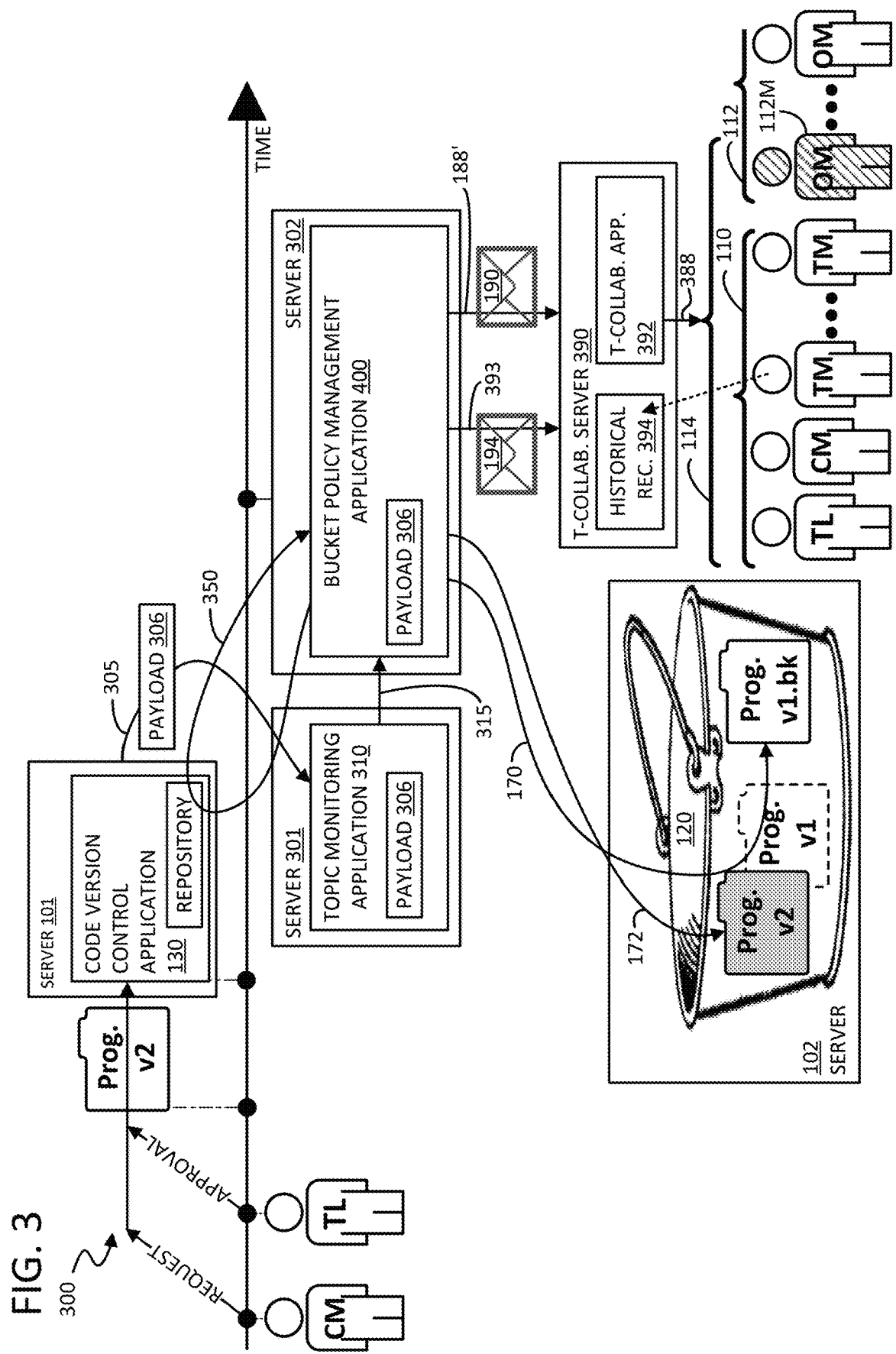
FIG. 3 illustrates a time plot example using block diagrams to illustrate an automatic bucket policy management arrangement where it is automatic that all affected members are completely and consistently informed of changes to a policy code as they occur, and where it is automatic that a complete and consistent historical record is maintained regarding all policy code changes as they occur over time.

Description turns next to FIG. 3 illustrating an arrangement 300 providing automatic bucket policy management in which a number of bucket policy management operations are automatically performed so that all affected members are completely and consistently informed of changes to a policy code as they occur. Further, a complete and consistent historical record is automatically compiled and maintained regarding all policy code changes as they occur over time. To assist in accomplishing automatic operations, The FIG. 3 embodiment includes additional servers 301 and 302, and an additional team-collaboration server T-COLLAB SERV 390.

While servers 301, 302 and 390 are illustrated as being separate servers, practice of the present embodiments is not limited to having three separate servers, or to having only these three additional servers. More particularly, as one example, services of the servers 301, 302 and 390 might instead be provided by a single (common) server. As another example, any of the servers 301, 302 and 390 might be provided by plural servers rather than a single (sole) server 301, 302 or 390.

The server 301, in some embodiments, includes a TOPIC MONITORING APPLICATION 310, while the server 302, in some embodiments, includes a BUCKET POLICY MANAGEMENT APPLICATION 400. Both of the TOPIC MONITORING APPLICATION 310 and BUCKET POLICY MANAGEMENT APPLICATION 400 receive and utilize a PAYLOAD 306 as will be discussed ahead. Next, in some embodiments, the team-collaboration server T-COLLAB APP SERV 390 includes a team-collaboration application T-COLLAB APP 392 and a historical record 394.

As another change, FIG. 3 shows (representatively via the arrow 305) the CODE VERSION CONTROL APPLICATION 130 embodiment is configured to output a PAYLOAD 306 (example contents described ahead with respect to FIG. 5 description), and the TOPIC MONITORING APPLICATION 310 of the server 301 is configured to receive the PAYLOAD 306.

As mentioned previously, CODE VERSION CONTROL APPLICATION 130 (sending the PAYLOAD 306) may be a publicly-available code version control application named Git or GitHub Inc. Git is free and open-source software distributed under the terms of the GNU ("GNU's not Unix") General Public License version 2, maintained by Junio Hamano since year 2005. Git is a version-control system for tracking changes in computer files and coordinating work on those files among multiple people, such as source-code management in software development. GitHub Inc., in contrast, is a web-based hosting service (owned by Microsoft since October 2018) for version control using Git. GitHub Inc. offers hosting with all of the distributed version control and source code management (SCM) functionality of Git as well as adding its own features. For sake of simplicity, it will be assumed that FIG. 3's server 101 and/or the CODE VERSION CONTROL APPLICATION 130 is/are implemented via GitHub Inc. hosting.

Of interest, one feature available within GitHub application is a Webhook which allows set up of a GitHub application to subscribe to one or more event which, if triggered, causes sending of a HyperText Transfer Protocol (HTTP) POST payload (having predetermined content) to a pre-designated (i.e., user programmed) Uniform Resource Locator (URL) address. The payload may be configured with a specific payload format (e.g., JavaScript Object Notation (JSON) formatted data) having relevant event information, which, in some embodiments, may include: the user (i.e., committer member CM) who performed the event (sender) as well as an address an organization's and/or REPOSITORY's on which the event occurred on. FIG. 5 illustrates one non-limiting example PAYLOAD 306 which will be discussed in greater detail ahead.

With the above-described Webhook feature in mind, a GitHub application for implementing the FIG. 3 CODE VERSION CONTROL APPLICATION 130 is, in some embodiments, configured to send the PAYLOAD 306 as a HTTP POST PAYLOAD every time a new or updated subject policy code (e.g., Prog.v2) is submitted to, and processed by, the CODE VERSION CONTROL APPLICATION 130, and is stored within the REPOSITORY. Sending of the HTTP POST PAYLOAD 306 is, again, illustrated representatively via the FIG. 3 arrow 305.

Continuing, in the FIG. 3 example embodiment, a TOPIC MONITORING APPLICATION 310 is a recipient of the HTTP POST PAYLOAD 306, and such application 310 stores a copy of the PAYLOAD 306 (as shown representatively via the block diagram labeled PAYLOAD 306 within application 310's block diagram). The TOPIC MONITORING APPLICATION 310, in some embodiments, monitors whether each incoming payload pertains to a predetermined topic, and if yes, triggers some type of reaction. With respect to the present embodiment, the TOPIC MONITORING APPLICATION 310 is configured to monitor whether a content of PAYLOAD 310 pertains to a change or updating of the subject policy code, and if yes, to trigger execution of automatic bucket policy management flow or algorithm.

One publicly-available (e.g., commercial) example of a TOPIC MONITORING APPLICATION 310 is Amazon's Simple Notification Service (SNS) which is a cloud service for coordinating the delivery of push messages from software applications to subscribing endpoints and clients. As an aside, Amazon SNS is advantageous in terms or providing redundancy protection in that all messages published to Amazon SNS are warehoused across several availability zones to prevent loss. SNS allows users to push messages to any of numerous systems (e.g., Windows, Google, Apple, certain internet-connected smart devices) through use of an application programming interface (API). Alternatively, the Amazon Web Services (AWS) Management Console. SNS service allows the flexibility to send direct messages to several devices or to one subscriber (e.g., Amazon Simple Queue Service (SQS); AWS Lambda function; HTTP/S webhooks; Short Message Service (SMS); email) by using a sole publish request.

For sake of simplicity, it will be assumed that the TOPIC MONITORING APPLICATION 310 of the FIG. 3 embodiment is implemented via Amazon's SNS, and that the SNS sends a triggering message shown representatively by the FIG. 3 arrow 315. Further, it is assumed that the triggering message 315 includes a forwarded copy of the PAYLOAD 306.

Next, the BUCKET POLICY MANAGEMENT APPLICATION 400 is a subscriber to the SNS TOPIC MONITORING APPLICATION 310, so that the application 400 receives the triggering message 315 and PAYLOAD 306. The application 400, in some embodiments, stores a copy of the PAYLOAD 306 (as shown representatively via the block diagram labeled PAYLOAD 306 within the application 400's block diagram).

FIG. 4 illustrates an example flow diagram having greater details of a BUCKET POLICY MANAGEMENT APPLICATION 400 included within the FIG. 3 time plot example.

Although the application 400 may be written, maintained and executed via any of a multitude of differing programming languages, platforms, etc., for sake of simplicity of description, it is assumed that BUCKET POLICY MANAGEMENT APPLICATION 400 is implemented as an Amazon Web Services (AWS) Lambda function.

More particularly, AWS Lambda is an event-triggered, computing platform available from Amazon, that runs code in response to events and automatically manages the computing resources required by that code. In the present FIG. 4 example, the AWS Lambda application 400 is configured to receive the triggering message 315 and PAYLOAD 306, and responsive thereto, to execute the FIG. 4 illustrated example operations.

In turning to greater details for FIG. 4's illustrated application 400, at operation 410, the PAYLOAD 306 is parsed. At operation 420, a REPOSITORY URL path of the subject bucket policy program is determined or constructed from the PAYLOAD 306. FIG. 5 illustrates a payload example showing greater details of PAYLOAD 306 used with the FIG. 3 time plot and the FIG. 4 flow diagram examples. While the FIG. 5 PAYLOAD shows example content, layout, formatting, protocol, etc., practice of embodiments are in no way limited to such example.

As can be seen by FIG. 5's example PAYLOAD 306, a REPOSITORY URL of the subject bucket policy program may be determined from the encircled data 510. In this instance, the URL is determined as:
"url":"https://github.kdc.VendorX.com/Crd Rewards/rewards aws bucket policies/commit/ c3b19377b471e47c1bed70e9c57015034d219242".

Next, at FIG. 4's operation 430, details regarding the committer member CM are determined from the payload. Again, as can be seen by FIG. 5's example PAYLOAD 306, committer member CM details may be determined from the encircled data 520. In this instance, the committer member CM is determined as:
"author":{"name":"Doe, John", "email": "John.Doe@VendorX.com", "username":"gs1475"}, "committer":{".

At FIG. 4's operation 440, further contents of the PAYLOAD 306 are used to determine whether the bucket policy program which was the subject of the request leading to the PAYLOAD 306, concern an added or modified bucket policy program. Such can be determined from the encircled data 530 of FIG. 5's example PAYLOAD 306. In this instance, modification data was determined as:
"modified":["dev/cof-card-dev-rewardscrd-dev-awsresources-west.json"]}], Continuing, at FIG. 4's operation 450, the determined REPOSITORY URL address is used to fetch a copy of the subject bucket policy program from the REPOSITORY. The fetch operation is shown representatively by FIG. 3's looping arrow 350 traversing the REPOSITORY, and by FIG. 4's looping arrow 350. After the fetch, the copy of the subject bucket policy program is stored within server 302 and a basic validation of such program is performed.

Although not shown, the FIG. 4 flow diagram may be configured such that, in an event where operation 450's basic validation check leads to an invalid result (e.g., errors occur), continued execution of the BUCKET POLICY MANAGEMENT APPLICATION 400 is ended and an error communication is generated (e.g., addressed to the committer) to inform of the unsuccessful validation. In contrast, in an event where operation 450's basic validation check leads to a valid result, continued execution of the BUCKET POLICY MANAGEMENT APPLICATION 400 is performed.

At FIG. 4's operation 460, further contents of the PAYLOAD 306 are used to determine a bucket name concerning the bucket policy program. Such can be determined from the encircled data 540 of FIG. 5's example PAYLOAD 306. In this instance, the bucket name was determined as:
"bucket":{"id":305304, "name":"rewards-aws-bucket-policies", "full_name":"Crd-Rewards/rewards-aws-bucket-policies".

Continuing, at FIG. 4's operation 470, the BUCKET POLICY MANAGEMENT APPLICATION 400 utilizes the determined bucket name to access the appropriate bucket 120 to automatically save (shown representatively by FIGS. 3 and 4's arrow 170) a back-up copy (shown by FIG. 3's solid-line file "Prog.v1.bk") of a currently-implemented subject policy code (shown by dashed-line file "Prog.v1"). Saving a back-up copy Prog.v1.bk provides the ability to easily reimplement (i.e., re-deploy) the currently-implemented subject policy code in the event that the updated subject policy code needs to be retracted for any reason (e.g., bugs; unpopular change; etc.).

Next, at FIG. 4's operation 480 and as show representatively by FIGS. 3 and 4's arrow 172, the BUCKET POLICY MANAGEMENT APPLICATION 400 utilizes the validation-verified copy of the processed Prog.v2 computer file for the updated subject policy code as previously stored within the server 302, to automatically overwrite (i.e., update) the currently-implemented subject policy code (overwriting shown representatively by FIG. 3's dashed-line "Prog.v1" file being partially overlapped by solid-line Prog.v2 file). After writing the Prog.v2 computer file into the bucket 120, the Prog.v2 becomes deployed and is running live, whereupon the updated subject policy code has been implemented (shown representatively by the FIG. 1 Prog.v2 file being darkened or shaded).

At FIG. 4's final operation 490, the BUCKET POLICY MANAGEMENT APPLICATION 400 automatically sends (see FIGS. 3 and 4's representative arrow 188') a notification communication 190 to the team-collaboration server T-COLLAB APP SERV 390 or directly to the team-collaboration application T-COLLAB APP 392. The notification communication 190 effects notification to all notification members representatively bracketed within the FIG. 3 notification member bracket 114, regarding the updated subject policy code having been implemented. Also, at operation 490, the BUCKET POLICY MANAGEMENT APPLICATION 400 sends (see FIGS. 3 and 4's representative arrow 393) a historical record communication 194 including historical record content to the team-collaboration server T-COLLAB APP SERV 390. While the communications 190 and 194 are illustrated as being separately provided and/or sent, practice of embodiments is not limited thereto. For example, the communications 190 and 194 may instead be sent as a single communication or as more than two communications.

The notification communication 190 is not limited in type or content, and may be provided, for example, as a file, email, text message, attachment, etc. As one non-limiting example detailing content for the notification communication 190, such communication may contain above-described four (4) items determined from the PAYLOAD 306, i.e.: REPOSITORY URL of the subject bucket policy program; committer member CM details; whether the bucket policy program which was the subject of the request leading to the PAYLOAD 306, concern an added or modified bucket policy program; bucket name concerning the bucket policy program. The notification communication 190 may additionally or alternatively contain any other designated information defined during a set-up of a design of the notification communication 190, e.g.: team leader TL details; details regarding any change(s) implemented; exact date/time of implementation; etc.

Likewise, the historical record communication 194 is not limited in type or content, and may be provided, for example, as a file, email, text message, attachment, etc. As one non-limiting example detailing content for the historical record communication 393, such communication may contain above-described four (4) items determined from the PAYLOAD 306, i.e.: REPOSITORY URL of the subject bucket policy program; committer member CM details; whether the bucket policy program which was the subject of the request leading to the PAYLOAD 306, concern an added or modified bucket policy program; bucket name concerning the bucket policy program. In addition, the historical record communication may be configured to include a copy of the processed Prog.v2 computer file for the updated subject policy code as retrieved from the REPOSITORY. Still further, the historical record communication 194 may additionally or alternatively contain any other designated information defined during a set-up of a design of the historical record communication 194, e.g.: team leader TL details; details regarding any change(s) implemented; exact date/time of implementation; etc.

The T-COLLAB. SERVER 390 and/or the T-COLLAB APP. 392 may be proprietary and owned/maintained by the organization (e.g., company; educational institution; governmental entity; association; etc.) which is implementing the subject policy code. Alternatively, the T-COLLAB. SERVER 390 and the T-COLLAB APP. 392 may be owned/maintained by a third-party entity and be web-based so as to be publicly- or commercially-available for free use or via some type of payment (e.g., per-use fee; tiered-usage fee; time-based subscription fee; etc.). Example commercially- or publicly-available server and/or team collaboration application services might be: Slack; Mattermost; Zulip; Riot; matrix; Flock; Ryver; Microsoft Teams; Hangout Chats; and tibber.

For sake of simplicity and brevity of this description, the T-COLLAB. SERVER 390 and the T-COLLAB APP. 392 are assumed implemented via Slack (acronym for "Searchable Log of All Conversation and Knowledge") offerings. More particularly, Slack is a cloud-based set of proprietary team collaboration tools and services, originally founded by Stewart Butterfield, which provide a platform allowing communications concerning a project (e.g., the subject policy code project) to be distributed to a designated group of members (e.g., a team) and establishes a Log where all (e.g., project-or team-collaboration) conversations and knowledge re a project are kept. A listing of current notification members 114 associated with the subject policy code may be maintained via the Slack application, and may be dynamically changed over time to coincide with changes made to the notification member pool. Such list updating in Slack accommodates all current notification members 114 being notified of subject policy code changes and having access to a historical record 394 of the subject policy code. FIG. 3's dashed arrow extending from one team member TM to the HISTORICAL REC 394 is representative of one team member TM's access to the historical record.

Next, FIG. 6 illustrates an embodiment of a storage medium 600. Storage medium 600 may include any non-transitory computer-readable storage medium or machine-readable storage medium, such as an optical, magnetic or semiconductor storage medium. In various embodiments, storage medium 600 may include an article of manufacture. In some embodiments, storage medium 600 may store computer-executable instructions, such as computer-executable instructions to implement one or more of logic flows or operations described herein, such as with respect to flow algorithms 400 of FIG. 4. Storage medium 600 may also store further computer-executable instructions, such as computer-executable instructions to implement other logic flows or operations, and may store data.

Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 7:
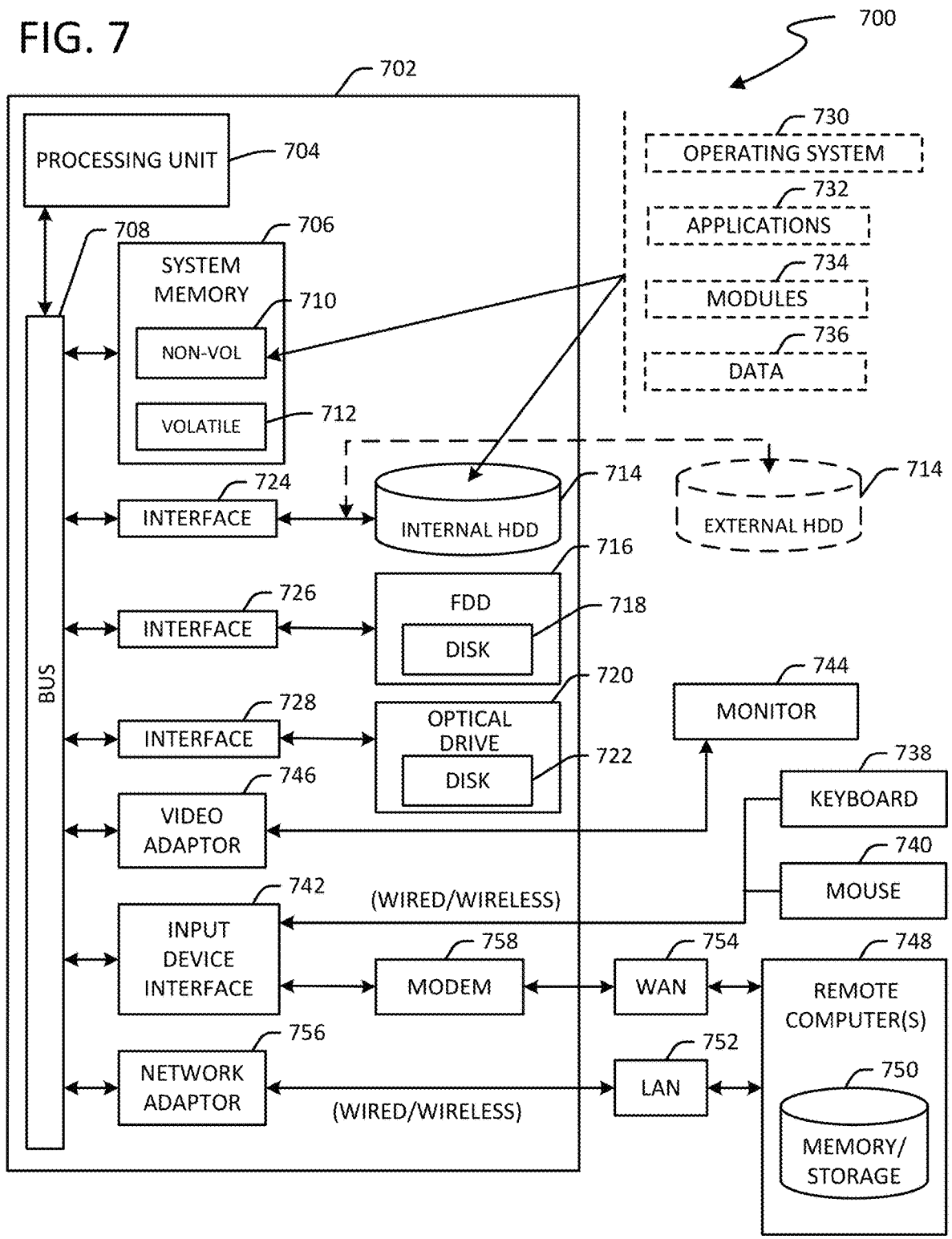
FIG. 7 illustrates an example embodiment of a computing architecture such as a server.

FIG. 7 illustrates an embodiment of an exemplary computing architecture 700 that may be suitable for implementing any of the components (e.g., computers, servers, client devices, etc.) of various embodiments as described anywhere within this disclosure. In various embodiments, the computing architecture 700 may include or be implemented as part of an electronic device. In some embodiments, the computing architecture 700 may be representative, for example, of a processor server that implements one or more components of the FIGS. 1-4 arrangements, such as any of the server 101, 102, 301, 302, 390 components. In some embodiments, computing architecture 700 may be representative, for example, of a computing device that implements one or more components of the server 101, server 102, server 301, server 302, and T-COLLAB. SERVER 390 arrangements. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes a processing unit 704, a system memory 706 and a system bus 708. The processing unit 704 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 704.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1594 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the aforementioned servers of the present disclosure.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 994 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

It should be appreciated that the example embodiments shown in the block diagram of several FIGS. may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments. Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

In the context of the present disclosure, unless expressly provided otherwise, the words "first", "second", "third", etc. have been used as adjectives only for the purpose of allowing for distinction between the nouns that they modify from one another, and not for the purpose of describing any particular relationship between those nouns.

As may or may not have been mentioned previously, various features, operations, etc. of this invention may be practiced "simultaneously", "concurrently" or "parallelly". As used within a content of this invention, the term 'simultaneous' means that two things (e.g., collecting; analyzing, etc., of differing information) happen at the same time (i.e., at least partially occur or overlap in time), while the term 'concurrent' means that the two things may occur during the same period of time, but do not necessarily happen at the same time. Concurrent is the broader term, and may include instances of things occurring simultaneously. If two things (e.g., collecting; analyzing, etc., of differing information) overlap in time partially but not completely, the things may be described as occurring concurrently, while the overlapping portion may be described as occurring simultaneously. Further, the term "parallel" means that two things occur along two differing paths or via differing operations. Parallel may include instances which occur simultaneously, instances which occur concurrently, and/or instances occurring at wholly differing time periods.

In this disclosure, the term "real time" refers to a time scale that is substantially simultaneous to an item or instance which provoked a subsequent action. In contrast, the term "near real time" refers to a time scale that is slower than the time scale referred to as "real time," for example by about one or more orders of magnitude, or by requiring a finite amount of time (e.g., milliseconds) rather than being substantially simultaneous.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

The invention claimed is:

1. A system, comprising:
memory configured to store instructions; and
a processor configured to execute the instructions, that when executed cause the processor to:
receive a payload comprising a Uniform Resource Locator (URL) path to a repository location to policy code to update a bucket policy code;
parse the payload to determine the URL path;
retrieve, via the URL path, the policy code from the repository location;
deploy the policy code received in the payload in an object store to update the bucket policy code; and
provide a notification comprising an indication of the update to the bucket policy code.

2. The system of claim 1, wherein the payload comprises one or more details of a committer who requested the update of the bucket policy code, the one or more details comprising a name, an email address, a username, or a combination thereof.

3. The system of claim 1, the processor to determine an object store name for the object store based on data in the payload.

4. The system of claim 3, wherein the data in the payload comprises object store name information and further comprising an identifier, a short name, a long name, or a combination thereof.

5. The system of claim 1, wherein the instructions are implemented as an Amazon Web Services (AWS) Lambda function which is triggered to automatically execute responsive to receipt of the payload.

6. The system of claim 5, wherein the AWS Lambda function is subscribed to receive the payload from a Simple Notification Service (SNS) via an Application Programming Interface (API).

7. The system of claim 1, the processor to:
perform a validation on the policy code prior to the deploying of the policy code in the object store;
in response to the policy code not being valid, send a communication to a committer informing of an unsuccessful validation and halt the instructions; and
in response to the policy code being valid, permit the instructions to proceed.

8. The system of claim 1, wherein the payload is received from a publicly available code version control application.

9. The system of claim 1, wherein the payload is in a JavaScript Object Notation (JSON) format.

10. The system of claim 1, the processor to store a backup copy of an existing policy code in the object store prior to deploying the policy code.

11. A computer-implemented method, comprising:
receiving, by a server, a payload comprising a Uniform Resource Locator (URL) path to a repository location to policy code to update a bucket policy code;
parsing, by the server, the payload to determine the URL path;
retrieving, by the server at the URL path, the policy code from the repository location;
deploying the policy code received in the payload in an object store to update the bucket policy code; and
providing a notification comprising an indication of the update to the bucket policy code.

12. The computer-implemented method of claim 11, wherein the payload comprises one or more details of a committer who requested the update to the bucket policy code, the one or more details comprising a name, an email address, a username, or a combination thereof.

13. The computer-implemented method of claim 11, comprising determining an object store name for the object store based on data in the payload.

14. The computer-implemented method of claim 13, wherein the data in the payload comprises object store name information and further comprising an identifier, a short name, a long name, or a combination thereof.

15. The computer-implemented method of claim 11, comprising automatically executing instructions are implemented as an Amazon Web Services (AWS) Lambda function responsive to the receiving of the payload.

16. The computer-implemented method of claim 15, wherein the AWS Lambda function is subscribed to receive the payload from a Simple Notification Service (SNS) via an Application Programming Interface (API).

17. The computer-implemented method of claim 11, the processor to:
perform a validation on the policy code prior to the deploying of the policy code in the object store;
in response to the policy code not being valid, sending a communication to a committer informing of an unsuccessful validation and halt the instructions; and
in response to the policy code being valid, permitting the instructions to proceed.

18. The computer-implemented method of claim 11, wherein the payload is received from a publicly available code version control application.

19. The computer-implemented method of claim 11, wherein the payload is in a JavaScript Object Notation (JSON) format.

20. The computer-implemented method of claim 11, the processor to store a backup copy of an existing policy code in the object store prior to deploying the policy code.

* * * * *